United States Patent
Moorhouse et al.

(10) Patent No.: US 7,854,480 B2
(45) Date of Patent: Dec. 21, 2010

(54) SEAT SUSPENSION SYSTEM

(75) Inventors: David Moorhouse, Long Buckby (GB); Phillip Britton, Wellingborough (GB)

(73) Assignee: KAB Seating Limited, Northampton (GB)

( * ) Notice: Subject to any disclaimer, the term of this patent is extended or adjusted under 35 U.S.C. 154(b) by 744 days.

(21) Appl. No.: 10/599,917

(22) PCT Filed: Apr. 15, 2005

(86) PCT No.: PCT/GB2005/001433

§ 371 (c)(1),
(2), (4) Date: Jul. 25, 2007

(87) PCT Pub. No.: WO2005/100085

PCT Pub. Date: Oct. 27, 2005

(65) Prior Publication Data

US 2007/0278377 A1   Dec. 6, 2007

(30) Foreign Application Priority Data

Apr. 15, 2004   (GB) .................................. 0408366.3

(51) Int. Cl.
*B60N 2/50* (2006.01)
(52) U.S. Cl. ................................................. 297/344.12
(58) Field of Classification Search ............ 297/344.12, 297/344.16, 336, DIG. 10; 248/564
See application file for complete search history.

(56) References Cited

U.S. PATENT DOCUMENTS

| | | | | | |
|---|---|---|---|---|---|
| 3,109,621 | A | * | 11/1963 | Simons et al. ............... | 248/564 |
| 3,233,859 | A | * | 2/1966 | Beoletto ....................... | 248/566 |
| 3,752,432 | A | * | 8/1973 | Lowe ........................... | 248/564 |
| 3,788,697 | A | * | 1/1974 | Barton et al. ................ | 297/307 |
| 4,702,454 | A | | 10/1987 | Izumida | |
| 4,856,763 | A | * | 8/1989 | Brodersen et al. ............ | 267/131 |
| 4,946,145 | A | * | 8/1990 | Kurabe ......................... | 267/131 |
| 5,176,355 | A | * | 1/1993 | Carter .......................... | 248/550 |
| 5,799,922 | A | * | 9/1998 | Timms et al. ................ | 248/564 |
| 6,595,586 | B2 | * | 7/2003 | Brightbill et al. ............ | 297/312 |

FOREIGN PATENT DOCUMENTS

| | | |
|---|---|---|
| EP | 0457520 | 11/1991 |
| FR | 2438203 | 4/1980 |
| GB | 2169792 | 7/1986 |

\* cited by examiner

*Primary Examiner*—Joseph F Edell
(74) *Attorney, Agent, or Firm*—Ice Miller LLP

(57) ABSTRACT

The present invention relates to a suspension system for a vehicle seat. The system comprises a top portion (9) and a first part (1) having a base portion (2), means (3*b*, 20) to receive the top portion and means (3, 4) to allow movement of the base portion (2) and top portion (9) towards and away from each other. The system further comprises a second part consisting of a spring element (10, 14) adapted in use to control movement of the base portion (2) and top portion (9) towards and away from each other. The top portion (9) and the second part (10, 14) are, in addition, releasably connected (13, 11*a*, 20) to the first part (1). This suspension system allows for flexibility in the manufacturing process and the replacement of parts.

13 Claims, 2 Drawing Sheets

SEAT SUSPENSION SYSTEM

CLAIMING BENEFIT OF EARLIER FILING DATE, AND CROSS-REFERENCES TO OTHER APPLICATIONS

The present application is a U.S. National Application of and claims priority to PCT application number PCT/GB2005/001433 (the "Application"), filed Apr. 15, 2005, by David Moorhouse et al., which claims priority to Great Britain application number 0408366.3, filed Apr. 15, 2004, the contents of which are herein incorporated by reference.

The present invention relates to a seat suspension system, particularly for use in vehicles seats, such as driving seats.

In vehicles, particularly working vehicles such as trucks, buses, tractors construction and earth moving equipment, fork-lift trucks and industrial vehicles, where drivers spend a large amount of time in the driving seat, and often driving long distances or over uneven ground, the driving seat is provided with a suspension system. The suspension system is designed to isolate low frequency vibrations, which can have adverse effects on the well being of the driver, for example causing back or kidney problems, and which can also affect the driver's control of the vehicle.

There are a number of suspension systems in existence and these known systems generally comprise a mechanical portion, which allows the seat to move up and down with motion of the vehicle and an integral spring element, and usually a damper, to isolate vibrations from the vehicle and thus prevent, or reduce the amount of, vibrations reaching the driver.

The present invention provides a suspension system for a vehicle seat comprising:

a top portion;

a first part having a base portion, means to receive the top portion and means to allow movement of the base portion and top portion towards and away from each other;

a second part comprising a spring element adapted in use to control movement of the base portion and top portion towards and away from each other; and wherein the top portion and the second part are releasably connected to the first part.

The advantages of the present suspension system are that the manufacturing process is more flexible and the type of spring need not be decided until late in the manufacture process. Replacement of parts suffering from wear can be carried out without needing to discard the complete unit and the customer has more flexibility in the system being able to change the top portion or components of the system as required.

Preferably the top portion is provided with an upper surface and a lower surface and the top portion is adapted to receive a seat base on the upper surface. Preferably the base portion is provided with an upper surface and a lower surface and is adapted to be secured to a vehicle with the lower surface contacting the vehicle.

The means to allow the base portion and the top portion to move towards and away from each may be any suitable means.

For example, the top portion and the base portion may be secured to each other by the provision of at least one pair, preferably two pairs, of pivotally connected arms. A first arm in each pair preferably has cone end pivotally secured to the base portion and a second arm in each pair preferably has one end releasably pivotally secured to the top portion. The free end of each second arm is provided with means, such as a roller, slides or a swinging link, to allow it to move relative to a surface, preferably the upper surface, of the base portion. The free end of each first arm is provided with means, such as a roller, slides or a swinging link, to allow it to move relative to a surface, preferably a lower surface of the top portion. This arrangement allows movement of the top portion and base portion towards and away from each other.

In a first embodiment the spring element may be an air spring. The air spring may be positioned between the base portion and one of the first and second arms to control movement of the arms relative to the base portion. Alternatively the air spring may be positioned between the first and second arms of the at least one pair of arms to control movement of the arms relative to each other. The air spring may be positioned on a, or between two, suitable mountings positioned between the first arms or the second arms of a pair of arms.

In a second embodiment the spring element may comprise one or more mechanical tension springs. The or each mechanical tension spring preferably has a first and a second end wherein the first end is adapted to act on the free end of the first arm. The second end of the or each mechanical tension spring is secured to the top portion.

In both embodiments the tension in the spring element can be adjusted by any suitable means to allow for different drivers.

In both embodiments the top portion is releasably connected to the first part. The top part may be releasably connected to the first part by any suitable means. The top portion is preferably generally rectangular having a pair of opposing short sides and a pair of opposing long sides.

Most preferably the top portion is provided with one portion adapted to be releasably secured to each second arm of the first part. The or each portion adapted to be releasably secured to each second arm is preferably positioned on a long side of the top portion close to the point where the long side meets one of the short sides. Where there are two portions provided they are preferably positioned on opposing long sides close to where the long sides meet the same short side.

The or each portion adapted to be releasably secured to each second arm is preferably a wing extending from the opposing long side. The or each wing is preferably provided with an aperture therethrough to receive a pivot bolt. A corresponding aperture is provided through the or each second arm of the first part. A pivot bolt is provided of a suitable size to pass through the aperture in each wing and in each second arm.

The top portion is further provided with means to receive the free end of the or each first arm of the first part. Preferably the means to receive the free end of the or each first arm is positioned close to the opposite short side distal from the or each portion adapted to be releasably secured to, the second arm. The means to receive the free end of the or each first arm preferably comprises one or more channels in which the free end of the or each first arm is received. The or each channel is suitably sized to allow movement of the free end of the or each first arm over the lower surface of the top portion within the or each channel as the top part and base part move towards and away from each other.

In use the top portion is first positioned such that the free end of the or each first arm is received in the or each channel and then the second arm is secured to the top plate by means of the pivot bolt passing through the or each portion of the top plate and the or each second arm.

In the first embodiment, where an air spring is provided, the top part is preferably provided with means to receive one portion of an air spring, preferably mounted on the lower surface of the top part. Alternatively the base part may be provided with means to receive one portion of an air spring, preferably mounted on the upper surface of the base part.

In this embodiment there is preferably provided a means to receive a second portion of an air spring, which is releasably secured to the first or second arm or between the first arms or the second arms, preferably by use of a nut and bolt passing through the means to receive a second portion of an air spring and the first or second arms.

In the second embodiment, where at least one mechanical tension spring is provided, the or each spring has one end secured to the top portion by an appropriate means such as a hooked portion received by a corresponding bar mounted on the top portion. A second end of the or each spring is releasably secured to or between the free ends of the first arms. Where there are a pair of first and second arms a bar may be provided between the free ends of the pair of first arms. Preferably the second end of the or each spring is provided with a hooked portion adapted in use to be received by the bar extending between the free ends of the first arms. The bar may be movable along the free end of the first arm to adjust the tension in the spring. Alternatively the second end of the or each spring may be received by an aperture provided in the free end of each first arm.

In a third embodiment the means to receive the top part and to allow the base portion and the top portion to move towards and away from each other may comprise one or more bars designed to extend from the base portion and receive the top portion and being pivotally secured directly between the top portion and the base portion, or by pivotal linkages. A spring element may be placed between the top portion and base portion; the spring element may be an air spring, a compression spring or a tension spring.

An embodiment of the present invention will now be described with reference to the accompanying drawings in which.

Figure 1:
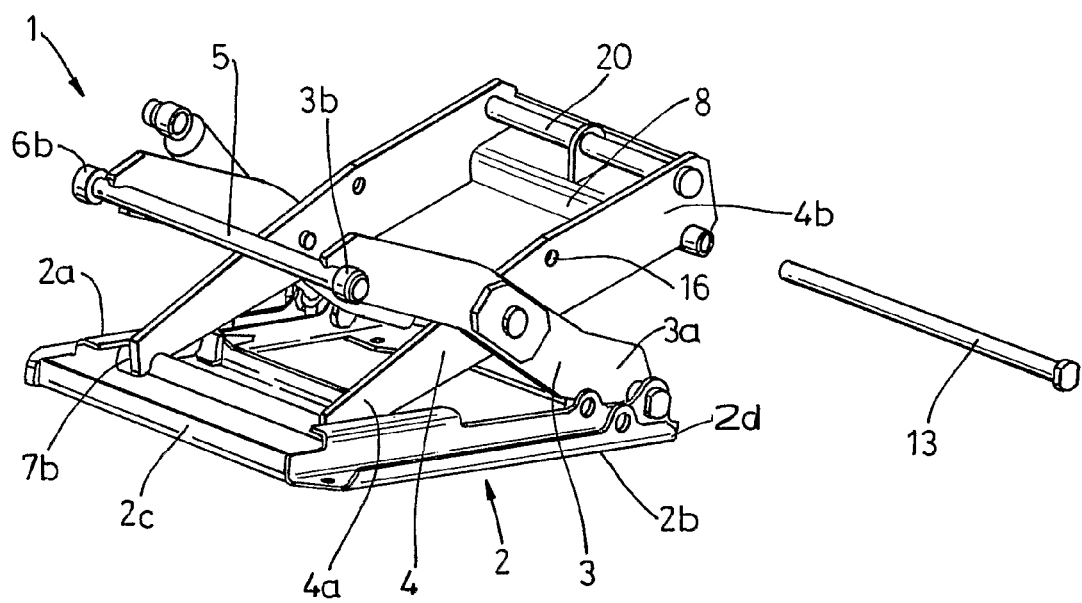
FIG. 1 shows a perspective view of a first part of a device of the present invention.

FIG. 1 shows a first part 1 of a seat suspension system. The first part comprises a base portion 2, which is generally rectangular in shape having a pair of opposing long sides 2a, 2b and a pair of opposing short sides 2c, 2d.

Two pairs of arms are provided with each pair comprising a first arm 3 and a second arm 4 pivotally secured together at their mid points to form a generally "X" shape.

The first arm 3 of each pair has a first end 3a pivotally secured to the base portion 2 at the corners where the long sides 2a, 2b meet the short side 2d.

The free ends 3b of the first arms 3 have an elongate bar 5 passing between them. Each end of the bar 5 is provided with a roller 6a, 6b.

Each second arm 4 has a free end 4a provided with a roller, such as roller 7b, that contacts and is movable over the base portion 2. The other ends 4b of the second arms are provided with an elongate hollow tube 8 and a bar 20 extending between them.

The first part 1 can be moved about the pivot joining the first and second arms of each pair by movement of the rollers, such as roller 7b, provided on the free ends of the second arms 4a, 4b over the base portion 2.

Figure 2:
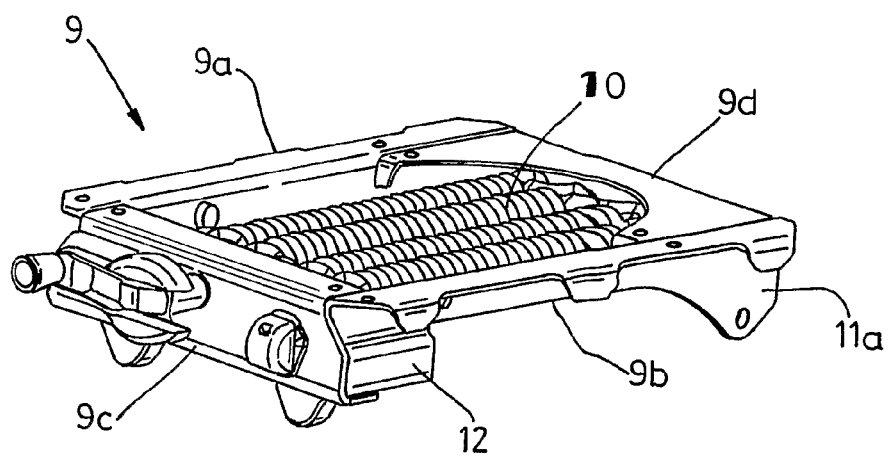
FIG. 2 shows a perspective view of a top portion according to a first embodiment of the present invention.

FIG. 2 shows a first embodiment of a top portion 9 of the present invention for releasable attachment to the first part 1 described above. The top portion 9 is generally rectangular in shape having a pair of opposing long sides 9a, 9b and a pair of opposing short sides 9c, 9d. A set of four tension springs 10 is provided extending substantially from one short side 9c to the other 9d. The springs 10 are secured substantially at short side 9c by the provision of a bar (not shown) extending between the two long sides close to short side 9c over which hooked portions of the springs are attached (not shown). This bar may be movable to adjust the tension in the set of springs 10 when in use.

The other ends of the springs 10 are provided with hooked portions which are adapted in use to be secured over the bar 20 extending between the pivotally secured ends 4b of the second arms 4 when the top portion is attached to the first part.

The top portion 9 has two wings, such as wing 11a, depending from the long side s 9a, 9b positioned close to the short side 9d. Each wing has an aperture therethrough.

The top portion 9 has a return nose portion 12 depending from the opposite short side 9c sized to receive the free ends 3b of first arms 3 of the first part 1 and to allow movement of the rollers 6a, 6b within the return nose portion.

In use the return nose portion 12 is positioned over and receiving the free end portions 3b of the first arms 3. The springs 10 are secured over bar 20 of part 1, this may be done by moving the movable bar towards the end 9d of the top portion 9 and then tension can be applied to the spring s by moving the movable bar towards the end 9c once the springs are in position over the bar 20 and the top portion is in place, The top portion 9 is then releasably secured to the first part 1 by passing a pivot bolt 13 through the apertures in the wings, such as wing 11a, and the hollow tube 8.

The tension in the set of springs 10 controls movement of the top portion 9 towards and away from the base portion 2 and isolates vibrations from the vehicle to the seat carried by the suspension system. One or more dampers and sets of bearings, not shown, are also included as and where necessary.

Figure 3:
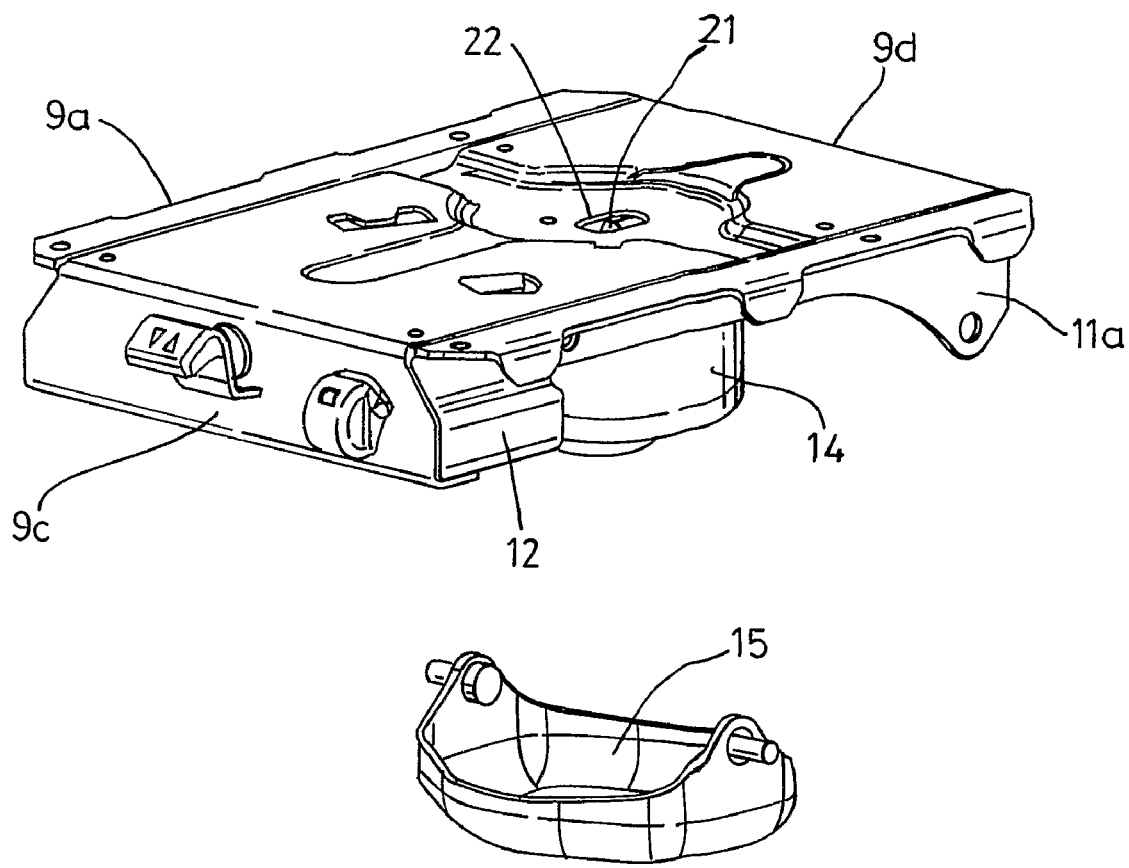
FIG. 3 shows a perspective view of a top portion according to a second embodiment of the present invention.

FIG. 3 shows a top portion according to a second embodiment wherein like numbers indicate like parts. The top portion 9 of the second embodiment is not provided with a set of springs 10 but instead has an air spring 14 received by a first mounting portion, not shown, depending from the lower surface of the top portion 9 and sized to receive a portion of an air spring 14. The air spring 14 is secured to the top portion 9 by means of a screw 21 received by an aperture 22 in the top portion 9. A second mounting portion 15 is provided to be releasably secured between the second arms 4 by means of nuts and bolts passing through the mounting portion 15 and apertures 16 provided in the arms 4.

In use the second mounting portion 15 is secured in place between the second arms 4 and air spring 14 is placed on the second mounting 15 such that when the top portion is secured to the first part 1, as described in relation to FIG. 2, the air spring is positioned between the first mounting and the second mounting 15 and acts between the top portion 1 and the arms 4 to control movement of the top portion 1 towards and away from the base portion 2 and to isolate vibrations. The air spring 14 is secured in position by means of screw 21.

The invention claimed is:

1. A method of manufacture of a suspension system for a vehicle seat comprising, the method comprising the steps of:
   combining an interchangeable top portions selected from the group consisting of a first interchangeable top portion and a second interchangeable top portion with an interchangeable second part selected from the group consisting of a first interchangeable second part having an air spring element and a second interchangeable second part having a tension spring element to form a combined upper portion, whereby the interchangeable second part is selected to combine with the selected interchangeable top portion; and releasably combining the combined upper portion with a first part comprising:
- a base portion,
- a first arm having a first end secured to the base portion and a second end capable of moving relative to a lower surface of the selected interchangeable top portion, and
- a second arm pivotally-connected to the first arm, the second arm having a first end capable of movement relative to an upper surface of the base portion and a second end releasably secured to the selected interchangeable top portion.

2. A method of manufacture of a system according to claim 1 wherein the selected interchangeable top portion is further provided with an upper surface.

3. A method of manufacture of a system according to claim 1 wherein the base portion is further provided with a lower surface.

4. A method of manufacture of a system according to claim 1 wherein the air spring element is positioned between the first and second arms to control movement of the arms relative to each other.

5. A method of manufacture of a system according to claim 4 wherein the air spring element is positioned on a, or between two, suitable mountings positioned between the first arm or the second arm.

6. A method of manufacture of a system according to claim 1 wherein the tension spring element has a first and a second end and wherein the first end is adapted to act on the second end of the first arm and the second end of the tension spring element is secured to the selected interchangeable top portion.

7. A method of manufacture of a system according to claim 1 wherein the selected interchangeable top portion is generally rectangular having a pair of opposing short sides and a pair of opposing long sides and the selected interchangeable top portion is provided with one portion adapted to be releasably secured to the second arm.

8. A method of manufacture of a system according to claim 7 wherein the one portion of the selected interchangeable top portion is a wing extending from the opposing long sides and the wing is provided with an aperture therethrough.

9. A method of manufacture of a system according to claim 8 wherein a corresponding aperture is provided through the second arm of the first part.

10. A method of manufacture of a system according to claim 9 wherein a pivot bolt is provided of a suitable size to pass through the aperture in the wing and in the second arm.

11. A method of manufacture of a system according to claim 1 wherein the second end of the first arm is received in one or more channels in the lower surface of the selected interchangeable top portion and the one or more channels is suitably sized to allow movement of the second end of the first arm over the lower surface of the selected interchangeable top portion within the one or more channels as the selected interchangeable top portion and the base part move towards and away from each other.

12. A method of manufacture of a system according to claim 1 wherein the first part further comprises one or more bars designed to extend from the base portion and receive the combined upper portion and being pivotally secured directly between the combined upper portion and the base portion, or pivotal linkages.

13. A method of manufacture of a suspension system for a vehicle seat comprising, the method comprising the steps of:
combining, in any order:
(i) one of two interchangeable top portions,
(ii) one of two interchangeable second parts, and
(iii) a first part;
wherein the one of two interchangeable second parts is selected from the group consisting of a first interchangeable second part having an air spring element and a second interchangeable second part having a tension spring element, and whereby the one of two interchangeable second parts is selected to combine with the selected interchangeable top portion;
wherein the first part comprises:
- a base portion,
- a first arm having a first end secured to the base portion and a second end capable of moving relative to a lower surface of the selected interchangeable top portion, and
- a second arm pivotally-connected to the first arm, the second arm having a first end capable of movement relative to an upper surface of the base portion and a second end releasably secured to the selected interchangeable top portion; and
wherein the selected interchangeable top portion and the selected interchangeable second part are releasably connected to the first part.

* * * * *